United States Patent
Mildner et al.

(10) Patent No.: US 10,052,941 B2
(45) Date of Patent: Aug. 21, 2018

(54) FRAMEWORK STRUCTURE FOR A VEHICLE DOOR IN PARTICULAR A VEHICLE SIDE DOOR

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 14/730,914

(22) Filed: Jun. 4, 2015

(65) Prior Publication Data
US 2015/0352932 A1 Dec. 10, 2015

(30) Foreign Application Priority Data
Jun. 4, 2014 (DE) .................. 10 2014 008 210

(51) Int. Cl.
*B60J 5/04* (2006.01)
*B21D 53/88* (2006.01)
*B60J 10/08* (2006.01)

(52) U.S. Cl.
CPC ............ *B60J 5/0455* (2013.01); *B21D 53/88* (2013.01); *B60J 5/042* (2013.01); *B60J 5/0429* (2013.01); *B60J 5/0443* (2013.01); *B60J 5/0463* (2013.01); *Y10T 29/49623* (2015.01)

(58) Field of Classification Search
CPC ...... B60J 5/0455; B60J 5/0443; B60J 5/0429; B60J 5/0463; B60J 5/042; B21D 53/88; Y10T 29/49623

USPC ...................................................... 296/193.05
See application file for complete search history.

(56) References Cited

U.S. PATENT DOCUMENTS

| | | | |
|---|---|---|---|
| 4,662,115 A * | 5/1987 | Ohya | B60J 5/0413 49/502 |
| 5,398,453 A | 3/1995 | Heim et al. | |
| 5,481,831 A | 1/1996 | Helm et al. | |
| 5,787,645 A * | 8/1998 | Heim | B60J 5/042 296/146.5 |
| 5,794,398 A | 8/1998 | Kaehler et al. | |
| 6,015,182 A | 1/2000 | Weissert et al. | |
| 6,022,070 A | 2/2000 | Ashina et al. | |
| 6,282,790 B1 | 9/2001 | Jaekel et al. | |
| 7,363,750 B2 * | 4/2008 | Seksaria | B60J 5/0416 49/349 |

(Continued)

FOREIGN PATENT DOCUMENTS

| | | |
|---|---|---|
| DE | 19821076 A1 | 11/1999 |
| EP | 0997331 A2 | 5/2000 |

OTHER PUBLICATIONS

German Patent Office, German Search Report for German Application No. 102014008210.5, dated Jan. 20, 2015.

*Primary Examiner* — Joseph Pape
*Assistant Examiner* — Dana D. Ivey
(74) *Attorney, Agent, or Firm* — Lorenz & Kopf, LLP

(57) ABSTRACT

A frame structure for a vehicle door and a method of manufacture thereof is disclosed. In particular, a vehicle side door includes at least two tubular parts which are flexurally deformed in the direction of their longitudinal extension and connected to each other to form a ring structure. The ring structure incorporated into a structural unit with the frame structure and a crash reinforcement in a vehicle door of a motor vehicle.

13 Claims, 9 Drawing Sheets

(56) References Cited

U.S. PATENT DOCUMENTS 7,380,865 B2 6/2008 Eckhardt et al.
7,503,619 B2 3/2009 Werner

* cited by examiner

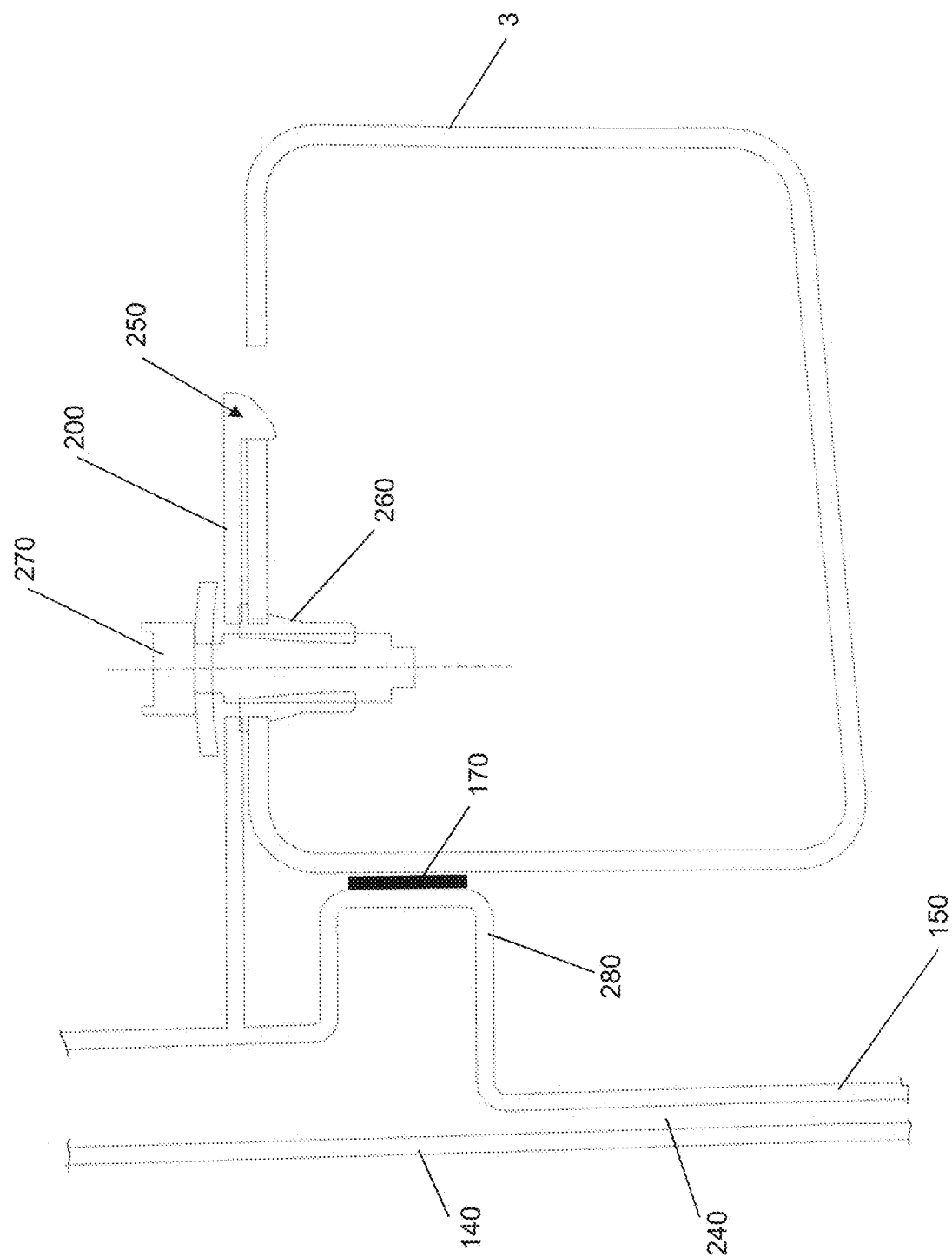

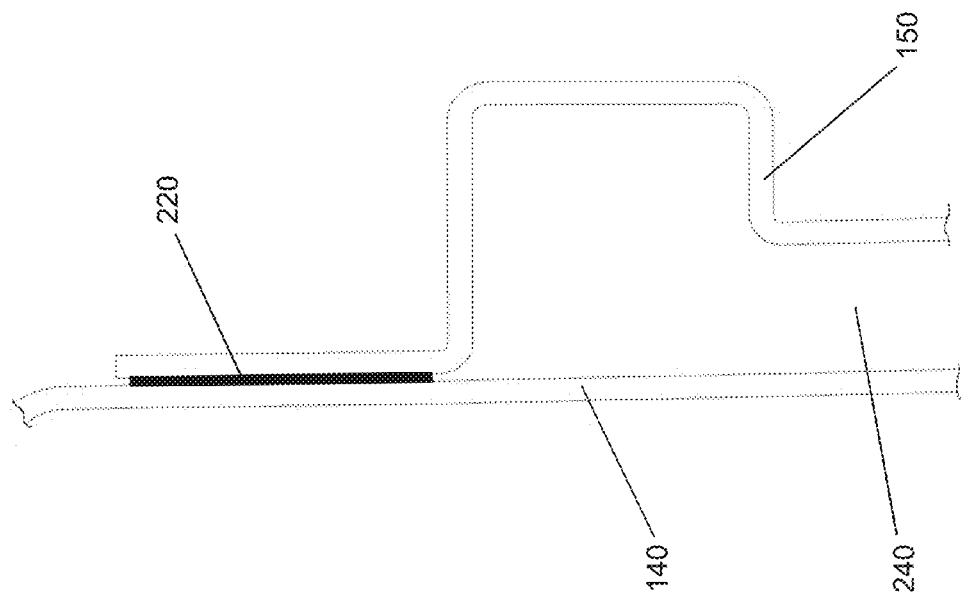

FRAMEWORK STRUCTURE FOR A VEHICLE DOOR IN PARTICULAR A VEHICLE SIDE DOOR

CROSS REFERENCE TO RELATED APPLICATION

This application claims priority to German Patent Application No. 102014008210.5 filed Jun. 4, 2014, which is incorporated herein by reference in its entirety.

TECHNICAL FIELD

The invention relates to a frame structure for a vehicle door, in particular to a vehicle side door, and furthermore relates to a vehicle door, in particular to a vehicle side door, having such a frame structure.

BACKGROUND

Future legal requirements regarding $CO_2$ emission of new motor vehicles call for among other things a drastic weight reduction with simultaneously rising requirements in terms of the structural behavior of the vehicle body with respect to durability, interior noise and travelling comfort. The aspect of weight reduction is additionally of relevant importance in the case of battery-operated vehicles in order to increase the range of the vehicles. Despite these increased requirements endeavors are made to keep production costs of the vehicles at a constant level or even reduce these.

SUMMARY

According to an embodiment, a frame structure for a vehicle door, in particular a vehicle side door, comprises at least two tubular formed parts that are connected to one another forming a ring structure. In particular, the formed parts are bending-formed in the direction of their longitudinal extension. In particular, the formed parts are connected to one another subject to forming a closed ring structure.

Because of its tubular designed formed parts and its ring structure, such a frame structure has a high stability. Because of the ring structure, the frame structure is additionally relatively torsionally stiff. At the same time, the frame structure can be produced relatively cost-effectively since it merely has to undergo technically simple bending forming in order to achieve the form for forming the ring structure. High tolerance requirements can also be satisfied through the bending forming.

The tubular formed part is to mean in particular an elongated body the length of which is substantially greater than its diameter. At least one of the formed parts or at least both formed parts are formed for example C-shaped or U-shaped. Because of this, the formed parts can be connected in a simple manner as far as production is concerned into a ring structure, in particular closed ring structure, by for example connecting the formed parts to one another at their respective ends.

The formed parts can be formed in such a manner that seen in the installed state on a vehicle and in the travelling direction of the vehicle one of the formed parts forms a front frame part and the other one of the formed parts forms a rear frame part of the frame structure. The formed parts can be connected to one another at connecting points, of which a connecting point is arranged on the frame structure in an upper region or portion, for example in the region or frame for a door window, and the other connecting point on the frame structure in a lower region or portion. Through such an arrangement of the formed parts relative to one another and in particular such an alignment of the connecting points, a vehicle door, in particular vehicle side door, with such a frame structure has a particularly high stability.

According to a configuration it is provided that the formed parts are connected to one another subject to forming at least one plug connection. Because of this, the ring structure can be realized in a simple manner by plugging the one of the formed parts with at least one portion into a portion of the other of the formed parts. Because of this, relatively accurate positioning of the formed parts relative to one another is achieved in a technically simple and durable manner.

The at least one plug connection is created for example in that at least one end portion of at least one of the shaped parts is tapered and plugged into the end of the other formed parts. The other formed part can remain unchanged in its cross section in its portion serving as receptacle. In particular, the portions of the formed parts plugged into one another have a contour that substantially corresponds to one another.

Complementarily or alternatively to the plug connection it can be provided that the formed parts are connected to one another through welding, soldering and/or gluing. It is conceivable that the formed parts are connected to one another through $CO_2$ welding or electromagnetic pulse welding. For example, the formed parts can be prepositioned relative to one another regarding their position by forming the plug connection, wherein through the subsequent welding, soldering and/or gluing fastening of the formed parts to one another is achieved by way of which pulling out of the plug connection is counteracted. The frame structure is also formed particularly torsionally stiff because of this.

According to a further configuration, it is provided that at least one of the formed parts is an extruded part and/or metal part, in particular light metal part. Because of this, the formed parts can be realized in a technically simple manner and cost-effectively. By the formed parts consisting of light metal or comprising light metal the aspect of preferably installing components that are light in weight in order to achieve a weight reduction of the overall vehicle is additionally taken into account.

According to a further configuration, a reinforcing structure reinforcing the frame structure is provided. This measure aims at stiffening the frame structure further, in particular to improve the torsional stiffness of the frame structure.

A particularly stable and in particular stiffened combination is achieved when the reinforcing structure on the one hand is connected to one of the formed parts and on the other hand to the other formed part. For example, the reinforcing structure can be connected on the one hand to one of the formed parts and on the other hand to the other formed part subject to firming at least one plug connection. Because of this, assembly of the frame structure is possible in a simple manner, in particular when the formed parts themselves are also connected to one another by forming at least one plug connection. Connecting the formed parts to one another is then achieved in a simple manner by plugging into one another. For example, by plugging the ends of the one formed part into the ends or the end portions of the other formed part the plug connection between the respective formed part and the reinforcing structure can be established at the same time in a simple manner, so that through a single joining movement, in particular a translational movement, the formed parts are connected to one another subject to including the reinforcing structure.

Complementarily or alternatively it can be provided that the reinforcing structure is connected to the formed parts by means of welding, soldering and/or gluing. It is conceivable to connect the reinforcing structure and the formed parts to one another by means of $CO_2$ welding or electromagnetic pulse welding. Because of this, the components are durably connected to one another in a fixed manner and a particularly torsionally stiff frame structure created. In the case of a present plug connection, pulling out of the plug connection is thereby securely avoided.

It is appropriate that the reinforcing structure is an extruded part and/or metal part, in particular light metal part. In this regard, the reinforcing structure can be realized in a technically simple manner. By embodying the framework structure as light metal part the reinforcing structure is additionally designed light in weight.

For example, the reinforcing structure is formed by an elongated profile part or comprises an elongated profile part. Because of this, the reinforcing structure can be realized in a technically simple manner. The reinforcing structure is favorably stiffened when it is tabular formed according to a configuration of the invention. It is conceivable that the reinforcing structure is formed as a bending-formed tubular formed part or profile part.

According to a further configuration, it is provided that at least one of the formed parts is a heat formed part. In addition, the at least two formed parts can each be a heat formed part. A heat formed part is to mean a component which has undergone forming by heat forming. Heat forming is to mean in particular a forming method in which the component to be formed is additionally subjected to a heat effect. Heat forming is in particular an internal pressure forming method, with which a blank, for example a pre-bent blank, is heated in order to improve the flow characteristic of the material. In particular, during heat forming, the part to be formed is heated in an upstream operation and the heated part subsequently formed.

By heat forming, the blank on which the formed part is based, can be brought into the final form of the respective formed part in a technically simple manner, wherein during the course of the forming, development of component stresses is counteracted because of the effect of heat. For example it is possible in a simple manner by means of the heat forming to emboss contours or formed regions out of the blank on which the formed part is based.

Provided that the formed parts are connected to one another by means of a plug connection it can be provided that at least one of the formed parts comprises at least one plug-in attachment and/or a tapered or expanded end portion, which is formed onto the formed part. The plug-in attachment or end portion can for example be embossed out of the formed part by means of heat forming.

The plug-in attachment or end portion comprises for example a circumferential wall wherein at a free end the plug-in attachment or end portion can be formed open. The plug-in attachment or end portion can also be formed closed at its free end. The circumferential wall of the plug-in attachment is then formed for example closed at a face end. The forms of the plug-in attachment or end portion can be formed or embossed through heat forming.

Provided the frame structure comprises a reinforcing structure for reinforcing the frame structure it can be provided, furthermore that the reinforcing structure is a heat formed part.

According to a further configuration, it is provided that the frame structure comprises at least one, preferentially multiple connecting points for pre-fixing and/or fastening attachment parts and/or function parts. Such attachment parts or function parts can be at least one crash reinforcing, at least one hinge part, at least one lock part and/or at least one paneling part or covering part, such as for example a door outer skin, a framework structure and/or a window guide unit. Because of this, a vehicle door or vehicle side door can be realized in a simple manner as far as production is concerned, since the components of the vehicle door are to be attached as attachment parts or function parts to the frame structure. The frame structure thus serves as support structure for the attachment parts.

Provided the formed parts of the frame structure are heat formed parts, the connecting points can be realized through embossing. The connection points can also be holes or beads, recesses or the like, which have for example been created by means of heat forming.

The invention furthermore relates to a method for producing a frame structure for a vehicle door, in particular a vehicle side door. With the method, at least two tubular formed parts are connected to one another subject to forming a ring structure, in particular closed ring structure, wherein blanks which form the base of the formed parts are bending-formed beforehand in such a manner that the ring structure is formed during the joining. Because of this, the frame structure can be realized in a simple manner as far as production is concerned. A frame structure produced in this manner can be a frame structure of the type described above.

A further step of the method can consist in that the bending-formed blanks in each case are subjected to heat forming, in particular are brought into a final form or the end form of the formed parts by means of heat forming. Because of this, contours and/or similar formed regions can be formed out of the blank, in particular embossed in order to achieve the desired end form of the formed parts in a simple and flexible manner. For example it is possible, because of this, to form, in particular emboss attachment pieces on a tubular blank which serve as plug-in attachment or plug-in piece for forming a plug connection.

It is appropriate that for forming the ring structure the formed parts are plugged together. Because of this, joining of the formed parts is possible in a technically simple manner. Exact positioning of the components relative to one another is also achieved in a simple manner.

Provided the frame structure comprises a reinforcing structure, for example a reinforcing structure of the type described above, it is appropriate the reinforcing structure on the one hand is plugged together with one of the formed parts and on the other hand with the other formed part. This measure also aims at carrying out the joining of the components in as simple as possible a manner.

In a particularly simple manner a connection is realized when the reinforcing structure is then joined or plugged together with the formed parts when the formed parts themselves are plugged together. In other words, simple inclusion of the reinforcing structure is achieved when the reinforcing structure with the formed parts is brought about during the course of the joining movement of the formed parts. For example it can be provided that the plugging together of the formed parts and the reinforcing structure takes place in a single translationally joining movement of the components.

Furthermore, the invention relates to a unit with a frame structure of the type described above and a crash reinforcement. The crash reinforcement in particular serves for reinforcing the frame structure against a lateral crash and a laterally offset front-end impact. Through the crash reinforcement a vehicle door provided with the frame structure, in particular a vehicle side door, is particularly reinforced against a lateral crash, i.e. a collision force acting against the side door.

It is appropriate that the crash reinforcement on the one hand is connected to one of the formed parts and on the other hand to the other formed part of the frame structure, in particular glued. Because of this a particularly stable combination subject to forming an additional connection between the formed parts of the frame structure is achieved in a technically simple manner.

Connecting the crash reinforcement to the frame structure by means of gluing is particularly appropriate when the frame structure consists of light metal and the crash reinforcement of steel plate. Because of this, contact corrosion is effectively avoided.

It is appropriate, furthermore, that the crash reinforcement acts on the edge region of the frame structure facing outward, which in the assembled state of the frame structure in or on a vehicle door or vehicle side door faces the outside of the vehicle door. Because of this, impact forces of the lateral crash are first absorbed by the crash reinforcement, so that the frame structure itself is relieved through the crash reinforcement.

Provided the frame structure comprises a reinforcing structure, for example a reinforcing structure of the type described above, the crash reinforcement should be arranged below the reinforcing structure. Because of this, the frame structure has a particularly high stiffness wherein the crash reinforcement acts in particular in the region of acting collision forces.

A particularly high reinforcing effect is developed by the crash reinforcement when according to a configuration of the invention the crash reinforcement comprises or consists of a formed, in particular hot-formed material and/or high-strength, particular super high strength material.

A further configuration of the invention consists in that the frame structure with the crash reinforcement is treated against corrosion, for example primed against corrosion, in particular dip-primed.

In addition to this, the invention comprises a vehicle door, in particular a vehicle side door, with a frame structure of the type described above and/or with a unit of the type described above.

It is appropriate that at least one attachment part and/or function part is pre-fixed and/or fastened to the frame structure. In particular, at least one, preferentially multiple paneling parts of a door paneling, in particular outer door paneling can be connected to the frame structure. The paneling parts can be fastened to the frame structure by means of an engagement connection, for example for pre-fixing, and/or by means of a screw connection. The vehicle door can thereby be realized in a simple manner as far as production is concerned since the attachment parts or function parts of the vehicle door for the greatest part or altogether can be or are connected to the frame structure. Because of this, a particularly stable combination of the vehicle door is also achieved since the frame structure serves as support for attachment parts of the vehicle door.

The door paneling can comprise a door outer skin and a framework structure. The framework structure serves in particular for reinforcing the door outer skin. The construction of the vehicle door or vehicle side door by means of the frame structure can then be provided in the manner that the door outer skin is connected to the framework structure, in particular connected by means of gluing and/or welding or friction welding, and the framework structure is connected to the frame structure, in particular fastened by means of engagement connection, for example for pre-fixing, and/or screw connection.

The door paneling can also comprise a window guide unit. In this case it can be provided that the window guide unit is connected to the door outer skin and/or the framework structure.

Furthermore, at least one sealing element can be provided, by means of which the door paneling is sealed against the frame structure.

Provided an engagement connection is provided, by means of which the door paneling is connected to or pre-fixed on the frame structure, it is appropriate that the sealing element is arranged between the door paneling and the frame structure and preloaded through the engagement connection. Because of this, a particularly good sealing effect is achieved by means of the sealing element.

In addition to this, the invention comprises a motor vehicle, which comprises a vehicle door of the type described above, in particular a vehicle side door.

As summarized above, a vehicle door, in particular a vehicle side door, can be realized which is relatively light in weight and can be produced with relatively little costs. Ill addition, the assembly of the vehicle door is simplified and the assembly time minimized through the invention.

BRIEF DESCRIPTION OF THE DRAWINGS

The present invention will hereinafter be described in conjunction with the following drawing figures, wherein like numerals denote like elements, and:

FIG. 8 shows the cross-section X according to FIG. 7 in an enlarged representation; and FIG. 9 shows the cross-section Y according to FIG. 7 in an enlarged representation.

DETAILED DESCRIPTION

Figure 1:
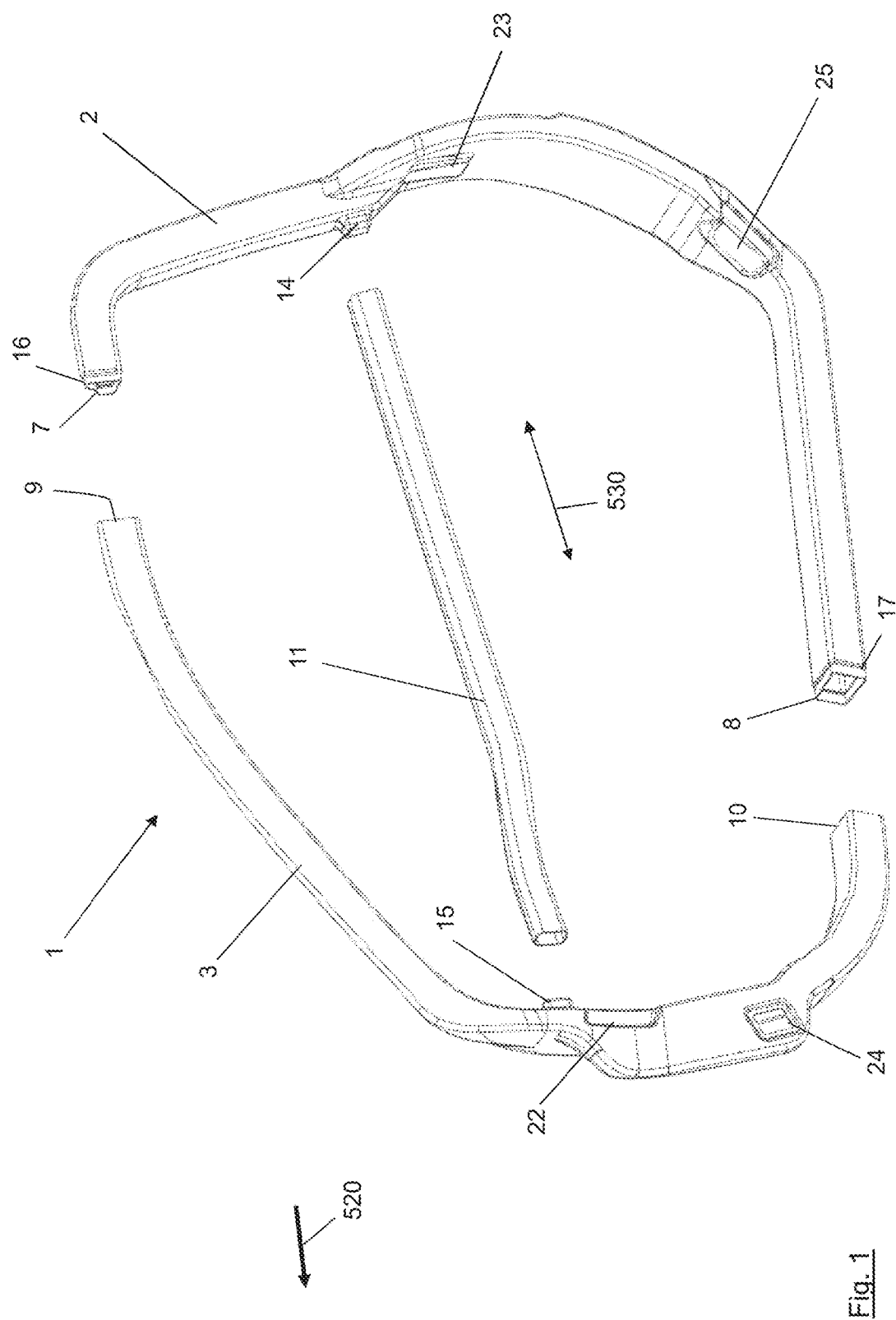
FIG. 1 shows an embodiment of a frame structure tier a vehicle side door illustrated in exploded representation.
Figure 2:
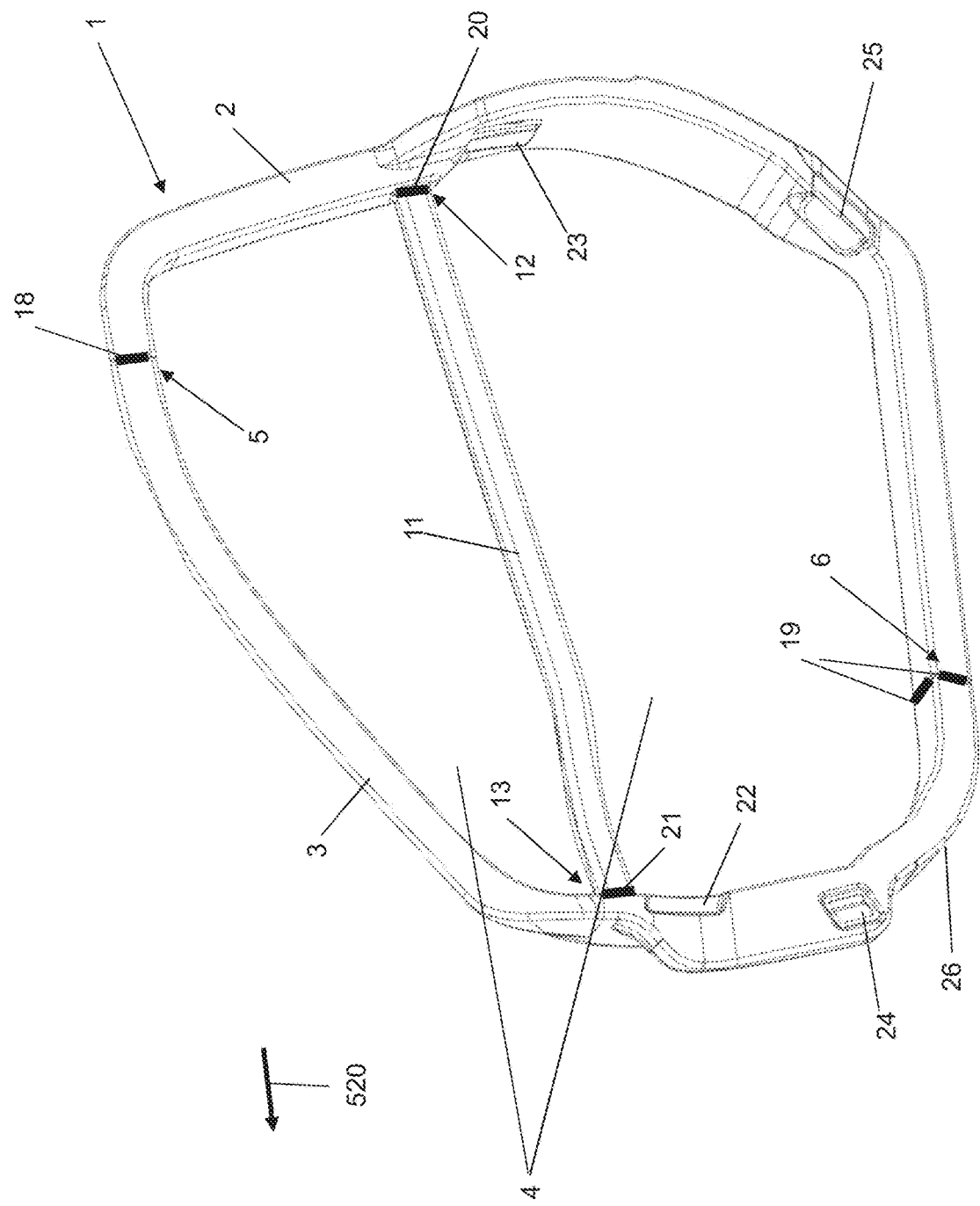
FIG. 2 shows the frame structure according to FIG. 1 in the assembled state in a lateral view.

The following detailed description is merely exemplary in nature and is not intended to limit the invention or the application and uses of the invention. Furthermore, there is no intention to be bound by any theory presented in the preceding background of the invention or the following detailed description FIG. 1 shows—in a schematic exploded representation a possible embodiment of a frame structure 1 for a vehicle door, in particular a vehicle side door. FIG. 2 shows the frame structure 1 in the assembled state.

As is evident from viewing FIGS. 1 and 2 together, the frame structure 1 comprises two formed parts 2 and 3, which are connected to one another subject t forming a preferentially closed ring structure 4.

Preferably, the formed parts 2, 3 are designed tubular or as tube profile, which are bending formed in particular in direction of their longitudinal extension. For example, the formed parts 2 and 3 are formed in such a manner that they are each substantially C-shaped or U-shaped and at their ends the one formed part 2 is connected to the other formed part 3. For example, the formed parts 2 and 3 are formed in such a manner that in the assembled state on a vehicle and seen in travelling direction of the vehicle, the formed part 2 form a rear frame part and the formed part 3 a front frame part of the ring structure 4. In the FIGS. 1 and 2, the travelling direction of a vehicle, in particular its forward travelling direction, is marked by the arrow 520.

Preferably, the connection of the formed parts 2 and 3 in each case is realized by a plug connection 5 and 6 respectively. To this end, the end portions 7 and 8 of the formed part 2 for example are formed tapered and plugged into a respective associated end 9 and 10 respectively of the other formed part 3.

Preferably, the formed parts 2 and 3 are additionally connected to one another by means of a structural connection 18 and 19 respectively. The structural connection 18 and 19 respectively can be brought about by means of welding, soldering and/or gluing. It is conceivable that the formed parts 2 and 3 are connected to one another by means of $CO_2$ welding or electromagnetic pulse welding.

Preferably, the frame structure 1 additionally comprises a reinforcing structure 11, which serves for reinforcing or stiffening, in particular torsionally stiffening the frame structure 1. Preferably, the reinforcing structure 11 is connected on the one hand to the formed part 2 and on the other hand to the formed part 3. For example, the connection of the reinforcement structure 11 to the formed part 2 and likewise to the formed part 3 can be realized by means of a plug connection 12 and 13 respectively. The reinforcing structure 11 is preferably tubular formed. Preferably, the reinforcing structure 11 is arranged furthermore below the belt line of a vehicle door or vehicle side door.

Preferably, the reinforcing structure 11 is additionally fastened to the formed parts 2 and 3 by means of a structural connection 20 and 21 respectively. The structural connection 20 and 21 respectively can be brought about through welding, soldering and/or gluing, for example through $CO_2$, welding or electromagnetic pulse welding. Preferably, the structural connections 20 and 21 as well as the structural connections 18 and 19 are arranged in the overlap region of the formed parts 2 and 3 relative to one another and in the overlap region of the formed parts 2 and 3 relative to the reinforcing structure 11, provided the formed parts 2 and 3 against one another and the formed parts 2 and 3 relative to the reinforcing structure 11 are each realized through the plug connections 12, 13 and 5, 6.

Preferably, the formed parts 2 and 3 and if appropriate the reinforcing structure 11 are formed from an extruded metal profile as blank, in particular an extruded light metal profile as blank. Preferably, at least the formed parts 2 and 3 and if appropriate also the reinforcing structure 11 are brought into an end form by means of heat forming. For example, the tapered end portions 7 and 8 of the formed part 2 can be created through embossing by means of heat forming. A plug-in attachment 14 and 15 respectively provided on the formed parts 2 and 3 respectively for plugging into the reinforcing structure 11 can have been formed through heat forming, in particular embossing.

Preferably, the tapered end portions 7 and 8 of the formed part 2 are each formed by a plug-in attachment 16 and 17 respectively, which has been produced by means of heat forming, in particular embossing. Preferably, the formed parts 2 and 3 are designed in such a manner and the plug-in attachments 14 and 15 on the formed parts 2 and 3 aligned in such a manner that the formed parts 2 and 3 and the reinforcing structure 11 together can be joined and exactly positioned through a single translational movement according to arrow 530.

Preferably, the frame structure 1 comprises multiple connecting points 22, 23, 24, 25 and 26 for fastening function parts and/or attachment parts. At least one of the connecting points 20, 23, 24, 25, 26 can be created for this purpose by means of heat forming, for example in that the at least one connecting point 22, 23, 24, 25 and 26 is formed through embossing. The connecting points 22, 23, 24, 25 and 26 can be recesses, apertures, holes, beads and/or similar forms.

Figure 3:
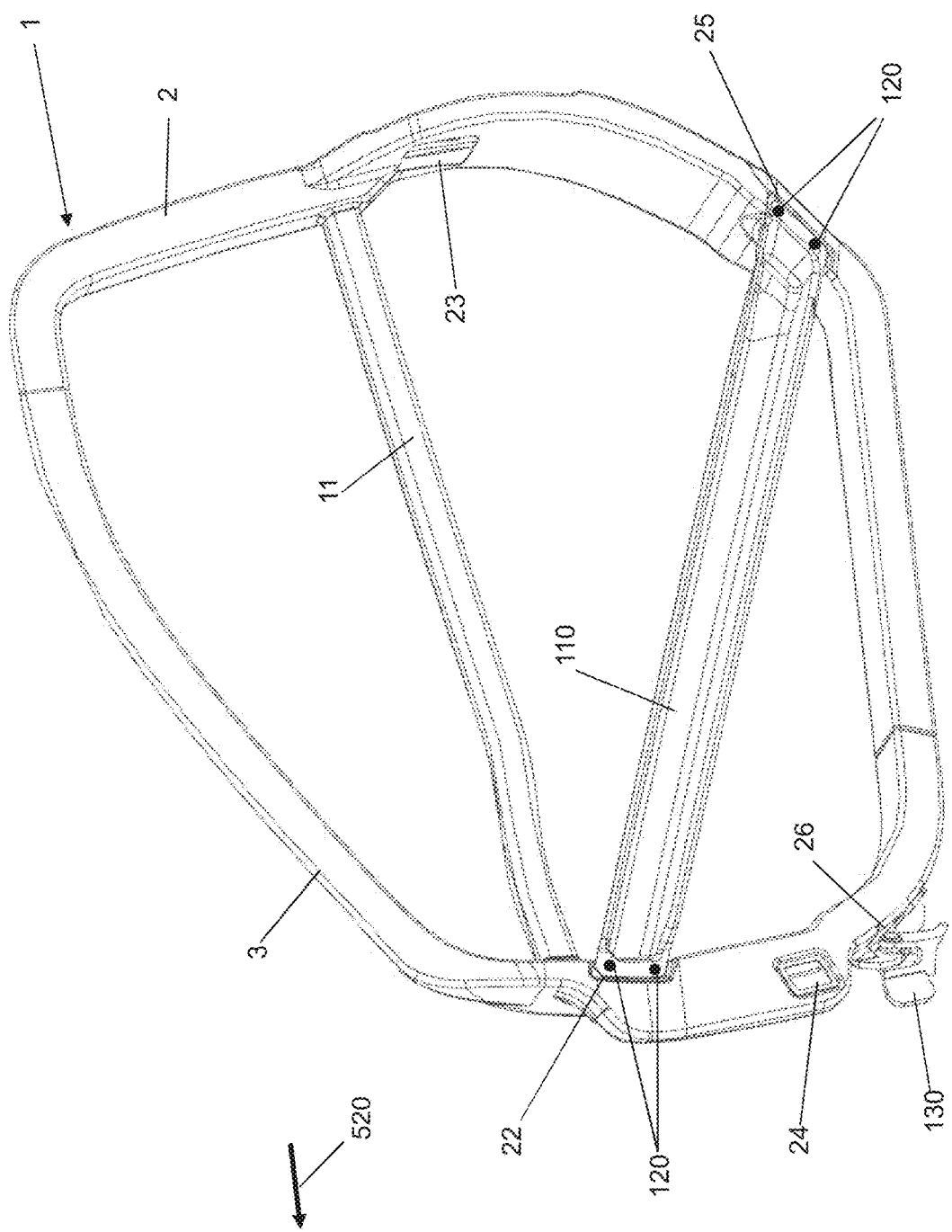
FIG. 3 shows the frame structure according to FIG. 1 with a crash reinforcement and an already assembled attachment part.

FIG. 3 shows the frame structure 1 according to the FIGS. 1 and 2 with a crash reinforcement 110 mounted thereon. The crash reinforcement 110 serves for reinforcing the frame structure 1 in the event of a lateral crash and of a laterally offset front impact against a vehicle door or vehicle side door, on which the frame structure 1 is mounted. Preferably, the crash reinforcement 110 is connected on the one hand to the formed part 2 and on the other hand to the formed part 3, for example glued. For this purpose, a portion of the crash reinforcement 110 acts on the connecting point 22 on the one hand and another portion of the crash reinforcement 110 on the connecting point 25 of the frame structure 1.

A glued connection of the crash reinforcement 110 to the frame structure 1 is preferable to avoid contact corrosion, provided the formed parts 2 and 3 of the frame structure are formed from a light metal and the crash reinforcement 110 from steel plate.

In addition, the crash reinforcement 110 can have a structural connection 120 on the formed parts 2 and 3, for example be fastened by means of rivets or screws.

Preferably, the crash reinforcement 110 is arranged on the edge region of the frame structure 1 facing outward, which in the state of the frame structure 1 on a vehicle door or vehicle side door faces the outside of the same. Preferably, the crash reinforcement 110 is arranged furthermore below the reinforcement structure 11.

Preferably, the frame structure 1 together with the crash reinforcement 110 are jointly treated against corrosion, in particular rust formation, tier example primed, in particular dip-primed. For example, the crash reinforcement 110 is formed from a hot-formed material, which is a high strength or super high strength material.

On the frame structure 1, a hinge part 130 can be mounted for example at the connecting point 26.

Figure 4:
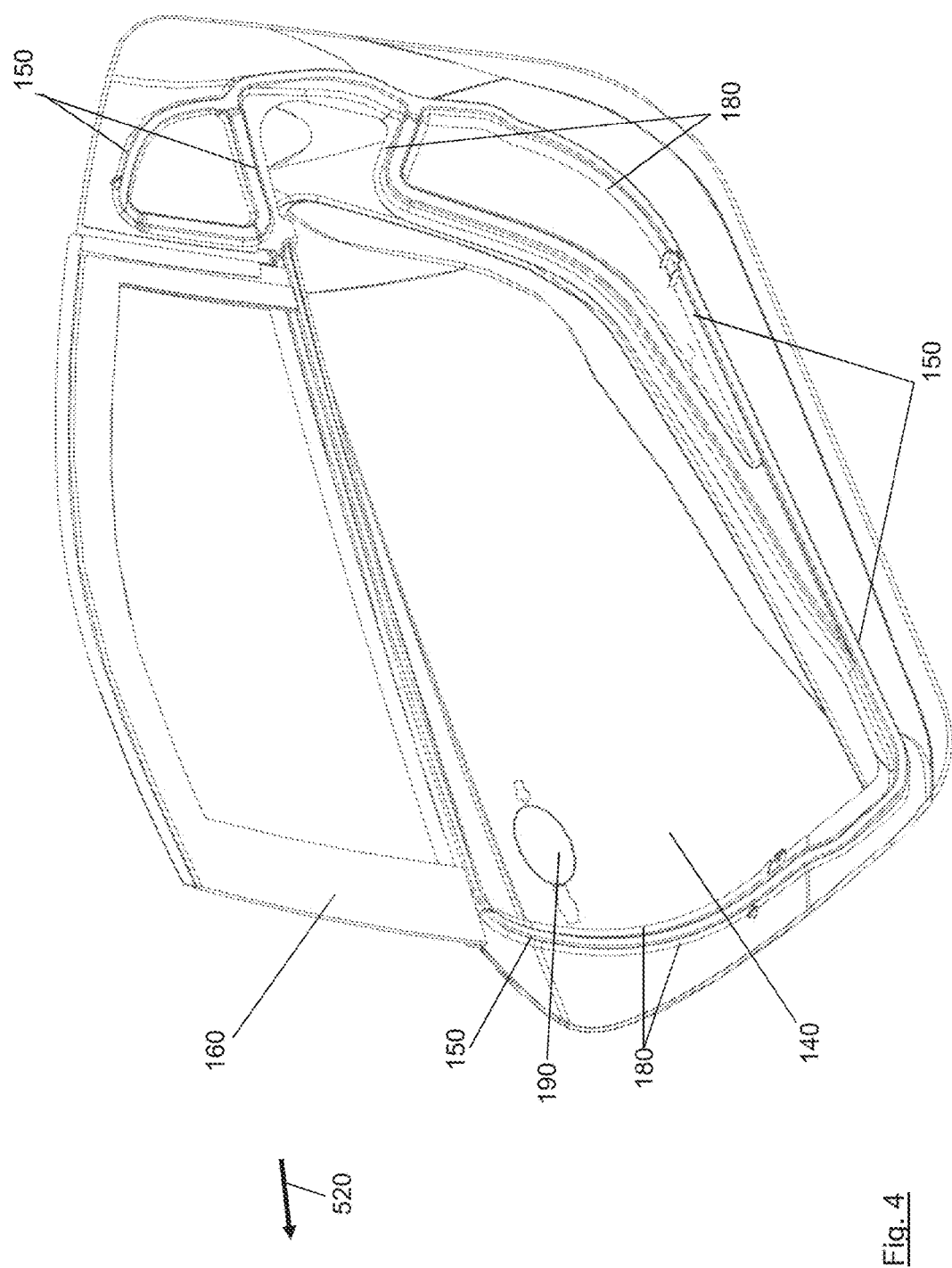
FIG. 4 shows another embodiment of an outer door paneling for a vehicle side door in a lateral view onto its inside.

FIG. 4 shows paneling parts for a vehicle side door. The paneling parts can comprise plastic material or consist thereof, wherein for example glass and/or carbon fiber can be additionally provided.

The paneling parts are a door outer skin 140, a framework structure 150 and a window guide unit 160. The framework structure 150 comprises at least one flange 180, to which the door outer skin 140 is connected, for example connected by means of gluing and/or welding. The window guide unit 160 is fastened to the door outer skin 140 and/or to the framework structure 150.

In the door outer skin 140 an aperture 190 can be provided, on which parts of a door handle or a door handle device can be mounted.

Figure 5:
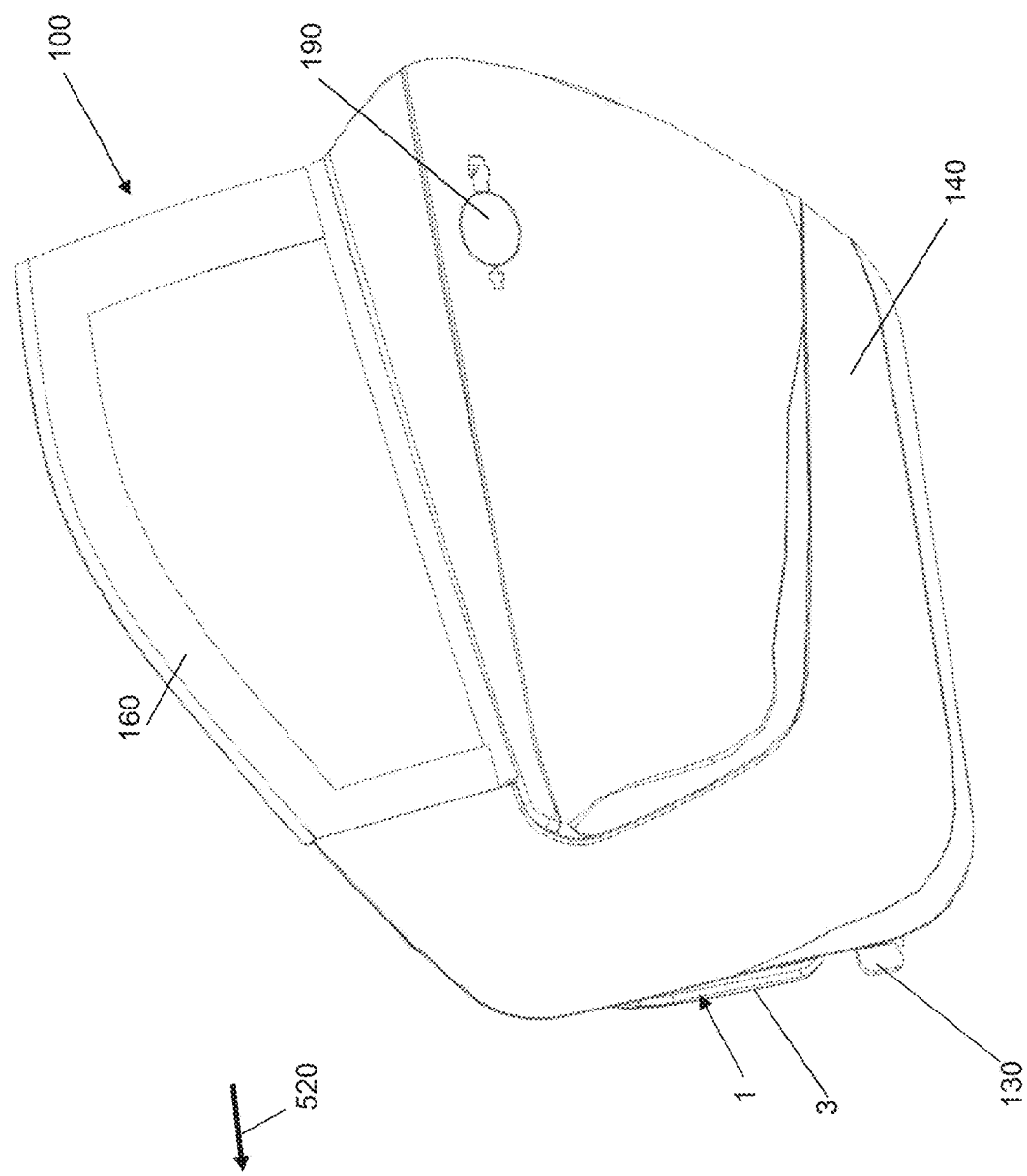
FIG. 5 shows an embodiment of a vehicle side door with the frame structure according to FIG. 1 and the door paneling according to FIG. 4 in a lateral view onto its outside.
Figure 6:
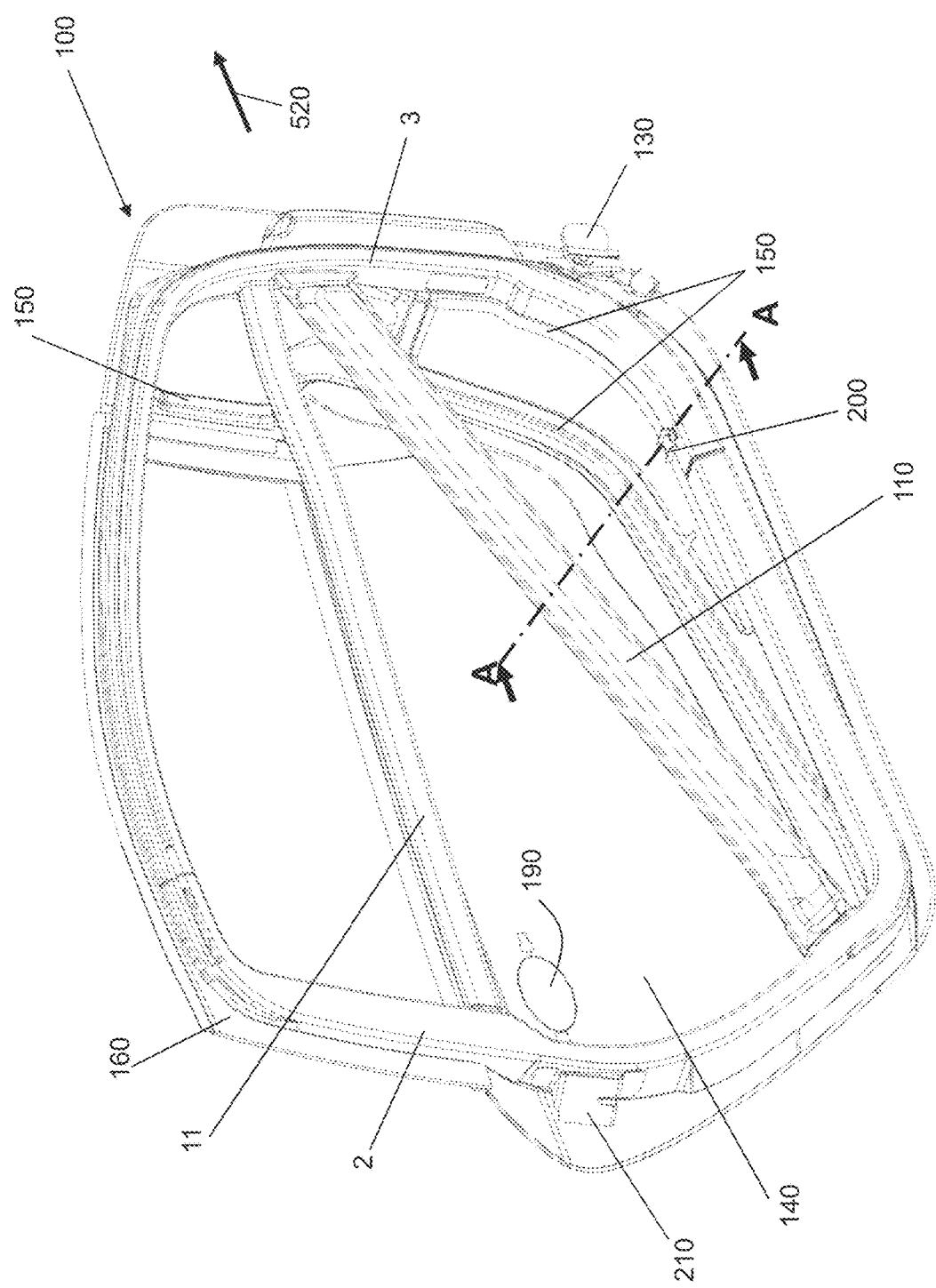
FIG. 6 shows the vehicle side door according to FIG. 5 in a lateral view onto its inside, wherein any inside paneling parts of the vehicle side door have been omitted.

FIGS. 5 and 6 show a vehicle side door 100 in a view onto its outside (FIG. 5) and in a view onto its inside (FIG. 6), wherein in the view onto the inside any inner paneling parts of the vehicle side door 100 have been omitted. As is evident from the FIGS. 5 and 6, the vehicle side door 100 comprises the frame structure 1 according to the FIGS. 1 and 2, which are assembled with the paneling parts according to FIG. 4. Preferably, the framework structure 140 is fastened to the frame structure 1.

Figure 7:
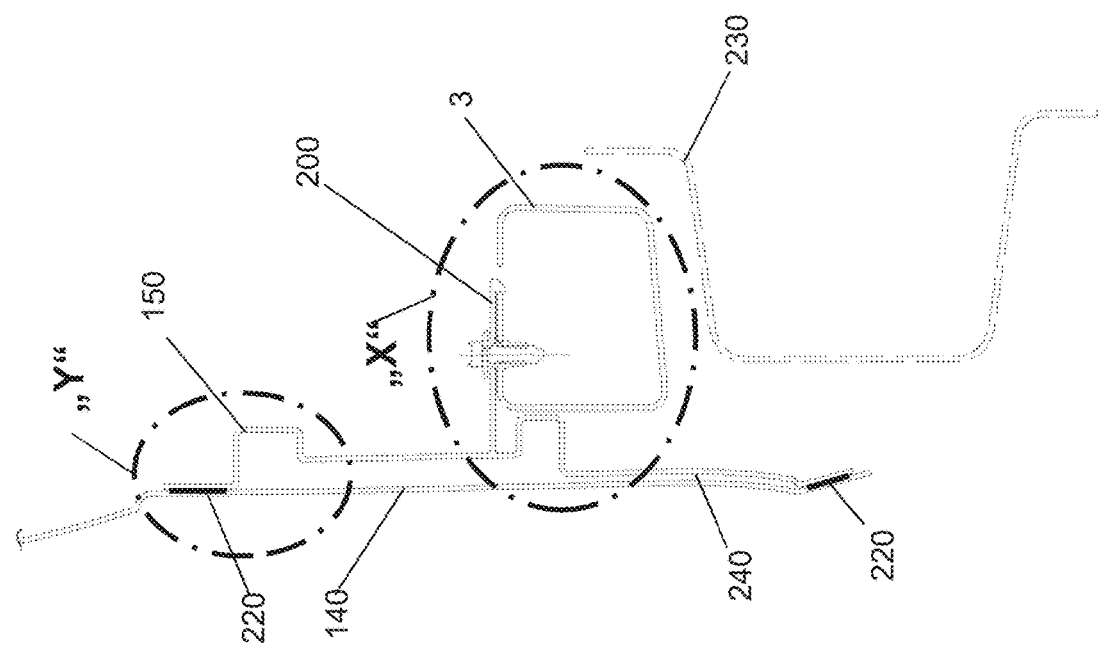
FIG. 7 shows an cross-section of the vehicle side door according to FIG. 6 in a sectional representation along the section line A-A according to FIG. 6.

A possible embodiment of the fastening of the framework structure 150 to the frame structure 1 is evident from FIG. 7, which shows a sectional representation along the section line A-A according to FIG. 6. There, a side wall 230 is additionally hinted, on which the door in the closed state is sealed towards the interior via a door seal which is not shown.

Preferably, an engagement connection 250 is provided for fastening the framework structure 150 to the frame structure 1, with a fastening strap 200 arranged on the framework structure 150, which with a lug engages into an aperture of the formed part 3 of the frame structure 1 subject to forming the engagement connection 250, which is evident in particular in the enlarged detail representation according to FIG. 8. For forming the engagement connection 250, the formed part 3 additionally supports itself with a portion of its wall against a wall portion 280 of the framework structure 150 preferentially projecting towards the front.

A sealing element 170 can be provided or connected (FIG. 8) in between the wall portion 280 of the framework structure 150, which is brought to lie against the frame structure 1 or the formed part 3. The sealing element 170 is preloaded when it is pressed between the formed part 3 and the engagement connection 250 in the direction towards the wall portion 280.

Preferably, the engagement connection 250 serves for pre-fixing the framework structure 150 relative to the frame structure 1. Preferably, a screw connection is additionally provided. The screw connection can be formed by a fastening element 270, which is formed for example in the manner of a fastening screw and engages through an aperture in the fastening strap 200 and an aperture in the formed part 3 and is screwed together against an insert nut 260 inserted into one of the apertures, so that through the interaction of the fastening element 270 and the insert nut 260 the additional connection between the framework structure 150 and the frame structure 1 is formed.

As is evident in particular from the FIGS. 7 and 8, the door outer skin 140 is arranged relative to the framework structure 150 at least partially spaced so that between the opposite wall portions there is a gap 240. The connection of the door outer skin 140 to the framework structure 150 can then relate to a given number of contact surfaces, for example on the flanges 180 provided for this purpose. There, fastening of the door outer skin 140 to the framework structure 150 can be realized by means of a structural connection 220. There, the structural connection can be formed for example through gluing and/or welding, in particular friction welding. As is evident in particular also from the enlarged part representation of FIG. 9.

Attachment parts or function parts of the vehicle side door 100 can be fastened to the frame structure 1 and/or the framework structure 150. For example, at least one lock part 210 can be connected to the frame structure 1, as is evident in particular from FIG. 6. In addition to this, attachment parts or function parts such as for example interior covering, a door handle, at least one loudspeaker, an electric window lifter or the like can be fastened to the framework structure 150 and/or the frame structure 1.

Although the invention was described by means of at least one exemplary embodiment it is to be understood that there exist a multitude of versions. It should also be noted that the exemplary embodiment or the exemplary embodiments are only examples and not intended to restrict the scope of protection, the applicability or feasibility or the construction in any way. The above description provides the person skilled in the art with a suitable guideline for implementing or carrying out at least one embodiment; it is to be understood that various changes in the function and arrangement of elements or components, which are described above in at least one exemplary embodiment, can be made without deviating from the scope of protection of the following claims and their legal equivalents.

The invention claimed is:

1. A frame structure for a vehicle door comprising:
   a closed ring door frame consisting of:
      a front unitary tubular member having an upper portion terminating at a first end, a hinge portion and a lower portion terminating at a second end;
      a rear unitary tubular member having an upper portion terminating at a third end, a lock portion and a lower portion terminating at a fourth end, wherein the first and third ends are connected by a upper plug connection and the second and fourth ends are connected by a lower plug connection such that the front and rear tubular members form the closed ring door frame;
   a reinforcement beam extending across the closed ring door frame between the hinge portion and the lock portion; and
   a side intrusion beam secured to an outwardly facing edge region of the closed ring door frame and extending between the front and rear tubular members.

2. The frame structure according to claim 1, wherein at least one of the first and second tubular members is an extruded part.

3. The frame structure according claim 1, wherein at least one of the first and second tubular members is a heat-formed part.

4. The frame structure according to claim 1, further comprising at least one plug-in attachment formed on one of the first and second tubular members.

5. The frame structure according claim 1, further comprises at least one connecting point configured to fasten a part to the closed ring door frame.

6. A vehicle door comprising a frame structure according to claim 1, and a paneling part connected to the frame structure by a fastener.

7. The vehicle door according to claim 6, further comprising a door outer skin and a framework structure, wherein the door outer skin is connected to the framework structure, and the framework structure is connected to the frame structure.

8. The vehicle door according to claim 7, further comprising at least one sealing element sealing the door outer skin against the framework structure.

9. The frame structure according to claim 7, further comprising:
   a fastening strap extending from the framework structure and terminating at a free end; and
   a lug formed on the free end and received in an aperture formed in the closed ring door frame.

10. The frame structure according to claim 9 further comprising a fastener extending through the fastener strap and into the closed ring door frame.

11. A motor vehicle comprising a vehicle side door according to claim 6.

12. The frame structure according to claim 1, wherein the frame structure further comprises a corrosion-resistant treatment.

13. A method for producing a frame structure for a vehicle door comprising:
- bending a first unitary tubular member to form an upper portion terminating at a first end, a hinge portion and a lower portion terminating at a second end;
- forming a first plug-in connection in the hinge portion;
- bending a second unitary tubular member to form an upper portion terminating at a third end, a lock portion and a lower portion terminating at a fourth end;
- forming a second plug-on connection in the lock portion;
- inserting a first end of a reinforcement beam into the first plug-in connection and a second end of the reinforcement beam into the second plug-in connection such that the reinforcement beam between the hinge portion and the lock portion;
- connecting the first and third ends with a third plug-in connection therebetween and the second and fourth ends with a fourth plug-in connection therebetween to form a closed ring door frame with the reinforcement beam extending across the closed ring door frame between the hinge portion and the lock portion; and
- securing a side intrusion beam to an outwardly-facing edge region of the closed ring door frame such that the side intrusion beam extends between the front and rear tubular members.

* * * * *